(12) United States Patent
Shuai et al.

(10) Patent No.: US 10,840,704 B2
(45) Date of Patent: Nov. 17, 2020

(54) FREQUENCY ADJUSTMENT METHOD FOR ISLANDED VIRTUAL SYNCHRONOUS MICRO-GRID

(71) Applicant: Hunan University, Hunan (CN)

(72) Inventors: Zhikang Shuai, Hunan (CN); Wen Huang, Hunan (CN); Chunming Tu, Hunan (CN); An Luo, Hunan (CN); Zheng Shen, Hunan (CN); Xuan Liu, Hunan (CN)

(73) Assignee: Hunan University, Changsha (CN)

( * ) Notice: Subject to any disclaimer, the term of this patent is extended or adjusted under 35 U.S.C. 154(b) by 0 days.

(21) Appl. No.: 16/714,764

(22) Filed: Dec. 15, 2019

(65) Prior Publication Data

US 2020/0119550 A1 Apr. 16, 2020

Related U.S. Application Data

(63) Continuation of application No. PCT/CN2019/079791, filed on Mar. 27, 2019.

(30) Foreign Application Priority Data

Apr. 27, 2018 (CN) .......................... 2018 1 0395023

(51) Int. Cl.
*H02J 3/02* (2006.01)
*H02J 13/00* (2006.01)
(Continued)

(52) U.S. Cl.
CPC ................ *H02J 3/02* (2013.01); *G05B 15/02* (2013.01); *H02J 3/388* (2020.01); *H02J 13/00006* (2020.01)

(58) Field of Classification Search
CPC ........ H02J 3/02; H02J 13/00006; H02J 3/388; G05B 15/02
(Continued)

(56) References Cited

U.S. PATENT DOCUMENTS 9,720,395 B2 8/2017 Shi
2016/0248256 A1* 8/2016 Chisenga ................. H02J 1/10
(Continued)

FOREIGN PATENT DOCUMENTS

CN 103001223 A 3/2013
CN 103580915 A 2/2014
(Continued)

*Primary Examiner* — Jigneshkumar C Patel
(74) *Attorney, Agent, or Firm* — Wayne & Ken, LLC; Tony Hom

(57) ABSTRACT

The present invention provides a method, a system and a storage medium for frequency adjustment of an islanded virtual synchronous micro-grid. The method includes: performing frequency adjustment on inverters in the micro-grid in a cyclic manner until the respective inverters reach rated frequencies; where each cycle includes: determining, in a differential delay manner, an inverter with a highest active output in the micro-grid as a reference unit, and sending a local output factor of the reference unit as a maximum output factor of a current cycle to other inverters; determining, for each inverter in the micro-grid, an active power adjustment amount of the inverter according to the maximum output factor, a preset rated frequency, a local output factor and an actual angular frequency of the inverter; and performing frequency adjustment on the inverter according to the active power adjustment amount.

7 Claims, 4 Drawing Sheets

(51) Int. Cl.
*H02J 3/38* (2006.01)
*G05B 15/02* (2006.01)

(58) Field of Classification Search
USPC .......................................................... 700/297
See application file for complete search history.

(56) References Cited

U.S. PATENT DOCUMENTS

2018/0097452 A1* 4/2018 Chapman .............. H02M 7/493
2019/0044342 A1* 2/2019 Pande ...................... H02J 3/46

FOREIGN PATENT DOCUMENTS

| CN | 104734202 | A | 6/2015 |
| CN | 105140936 | A | 12/2015 |
| CN | 105281350 | A | 1/2016 |
| CN | 105762841 | A | 7/2016 |
| CN | 106684910 | A | 5/2017 |
| CN | 106684921 | A | 5/2017 |
| CN | 108565861 | A | 9/2018 |

* cited by examiner

FREQUENCY ADJUSTMENT METHOD FOR ISLANDED VIRTUAL SYNCHRONOUS MICRO-GRID

CROSS-REFERENCE TO RELATED APPLICATIONS

This application is a continuation of International Patent Application No. PCT/CN2019/079791, filed on Mar. 27, 2019, which claims the benefit of priority from Chinese Patent Application No. 201810395023.5, filed on Apr. 27, 2018. The contents of the aforementioned application, including any intervening amendments thereto, are incorporated herein by reference in its entirety.

TECHNICAL FIELD

The invention relates to the technical field of micro-grids, and in particular to a method, a system and a storage medium for frequency adjustment of an islanded virtual synchronous micro-grid.

BACKGROUND OF THE PRESENT INVENTION

Micro-grid is an effective method to rationally utilize new energy sources such as solar energy and wind energy, and the frequency stability in the case of isolated island is the basis for its normal operation. Therefore, an effective coordinated control scheme for multiple machines is needed for rapid frequency adjustment of micro-grid.

SUMMARY OF THE PRESENT INVENTION

(1) Technical Problems Solved

The invention provides a method, a system and a storage medium for frequency adjustment of an islanded virtual synchronous micro-grid, which can realize the frequency adjustment and the proportion equalization of the active power under the premise of reducing the communication complexity as much as possible.

(2) Technical Solution

To achieve the above object, the present invention is achieved by the following technical solutions.

In a first aspect, the present invention provides a frequency adjustment method for an islanded virtual synchronous micro-grid, the method including: performing frequency adjustment on inverters in the micro-grid in a cyclic manner until the respective inverters reach rated frequencies to achieve frequency adjustment and power proportion equalization of the inverters; where each cycle includes:

S101. determining, in a differential delay manner, an inverter with a highest active output in the micro-grid as a reference unit, and sending a local output factor of the reference unit as a maximum output factor of a current cycle to other inverters in the micro-grid through a communication path;

S102. determining, for each inverter in the micro-grid, an active power adjustment amount of the inverter according to the maximum output factor, a preset rated frequency, a local output factor and an actual angular frequency of the inverter; and S103. performing frequency adjustment on the inverter according to the active power adjustment amount.

In a second aspect, the present invention provides a frequency adjustment system for an islanded virtual synchronous micro-grid, including:

a circulation module for performing frequency adjustment on inverters in the micro-grid in a cyclic manner until the respective inverters reach rated frequencies, to achieve frequency adjustment and power proportion equalization of the inverters; where the circulation module includes multiple circulation units, each of which includes:

a factor determining subunit, configured to determine, in a differential delay manner, an inverter with a highest active output in the micro-grid as a reference unit, and send a local output factor of the reference unit as a maximum output factor of a current cycle to other inverters in the micro-grid through a communication path;

an adjustment amount determining subunit, configured to determine, for each inverter in the micro-grid, an active power adjustment amount of the inverter according to the maximum output factor, a preset rated frequency, a local output factor and an actual angular frequency of the inverter; and a frequency adjustment subunit, configured to perform frequency adjustment on the inverter according to the active power adjustment amount.

In a third aspect, the present invention provides a computer storage medium having stored thereon a computer program that can implement the foregoing method when being executed by a processor.

(3) Beneficial Effects

Embodiments of the present invention provide a method, a system, and a storage medium for frequency adjustment of an islanded virtual synchronous micro-grid, which have the following beneficial effects. The present invention adopts a differential delay algorithm to independently select a maximum output factor. Compared with the diffusive information comparison over the whole system or adjacent units in the prior art, the system has a faster response speed and rapid frequency adjustment of the micro-grid is achieved. As a strategy of inverter control, because the local output factors of the respective inverters are the same, the frequency adjustment of the virtual synchronous micro-grid is realized, and the power proportion equalization of the inverters is ensured. Moreover, the communication path in the invention, only carrying one kind of data of the maximum output factor, has relatively small communication pressure, so the system is less affected by the communication delay and the communication failure, and the stability of the frequency adjustment is relatively high, which is very suitable for the occasions with high demand on frequency.

BRIEF DESCRIPTION OF THE DRAWINGS

In order to more clearly illustrate the embodiments of the present invention or the technical solutions in the prior art, the drawings used in the embodiments or the description of the prior art will be briefly described below. Obviously, the drawings in the following description are only certain embodiments of the present invention, and other drawings can be obtained based on these drawings by those skilled in the art without any creative work.

DETAILED DESCRIPTION OF THE PRESENT INVENTION

In order to make the purpose, technical solution and advantages of the embodiments of the present invention clearer, the technical solutions in the embodiments of the present invention will be clearly and completely described in conjunction with the drawings in the embodiments of the present invention. It is apparent that the described embodiments are some of, rather than all of, the embodiments of the invention. All other embodiments obtained by those skilled in the art based on the embodiments of the present invention without creative efforts are within the scope of the present invention.

Figure 1:
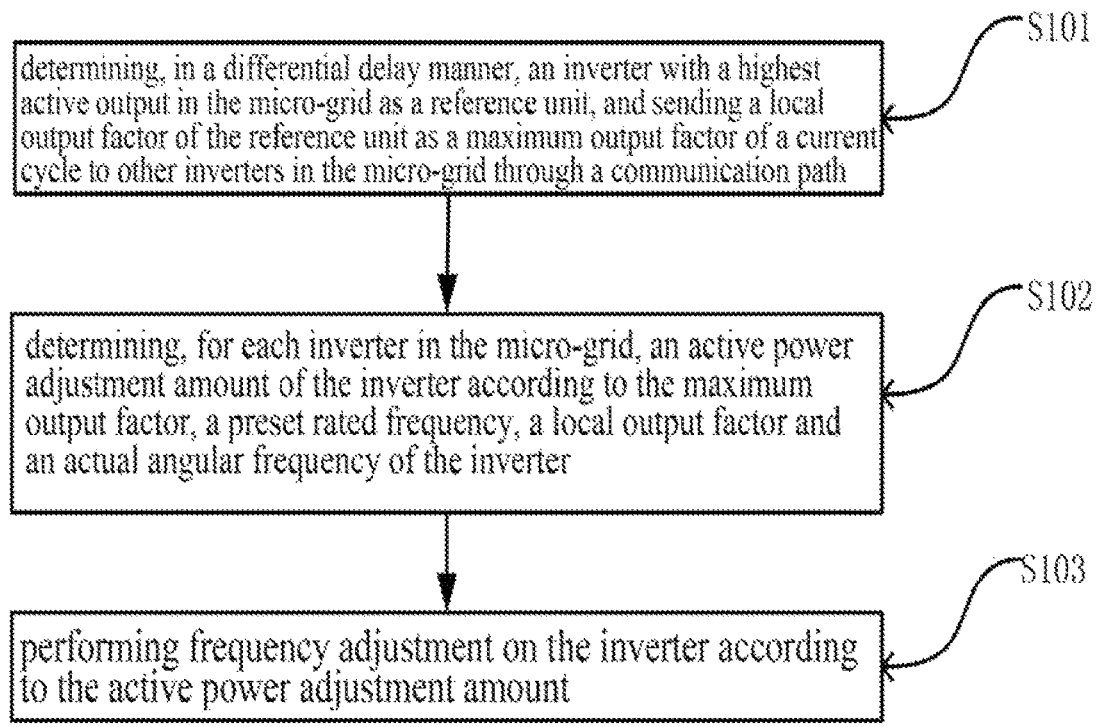
FIG. 1 is a schematic flow chart showing a frequency adjustment method of an islanded virtual synchronous micro-grid according to an embodiment of the present invention.
Figure 1:
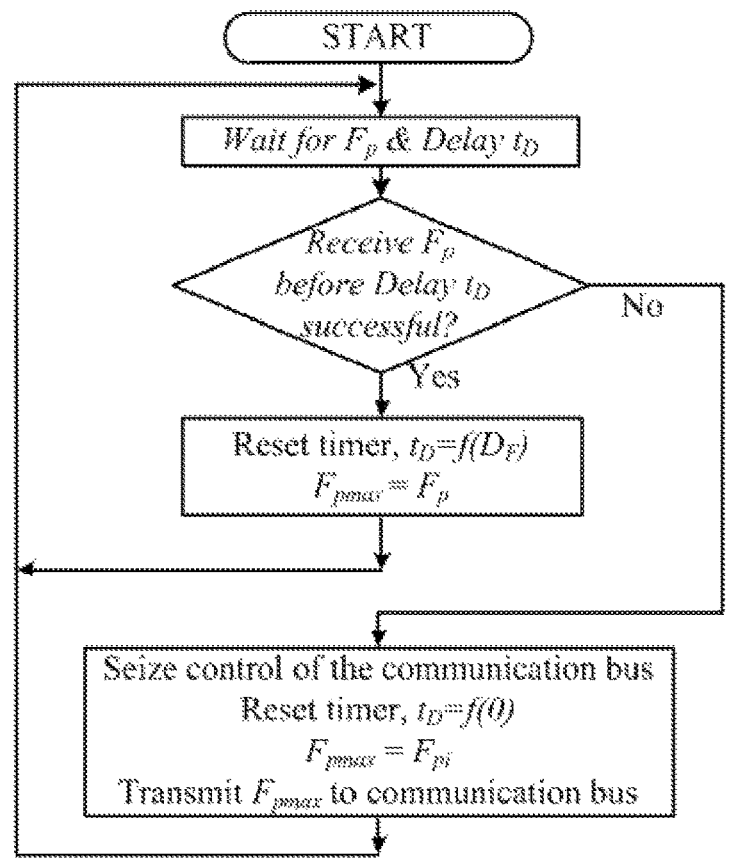

The invention provides a frequency adjustment method for an islanded virtual synchronous micro-grid, which includes performing frequency adjustment on inverters in the micro-grid in a cyclic manner until the respective inverters reach rated frequencies to realize each inverter to achieve frequency adjustment and power proportion equalization of the inverters; where, as shown in FIG. 1, each cycle includes the following steps.

S101. determining, in a differential delay manner, an inverter with a highest active output in the micro-grid as a reference unit, and sending a local output factor of the reference unit as a maximum output factor of a current cycle to other inverters in the micro-grid through a communication path.

It can be understood that the so-called differential delay algorithm is a method for determining a reference unit by virtue of the feature that different inverters have different latencies.

The output factor is a parameter that reflects the relative active output of the inverter, and its specific value can be calculated according to the output active power and rated power of the inverter. For example, the following formula is used to calculate a local output factor oif an i-th inverter:

$$F_{pi} = \frac{P_{ei}}{P_n} \quad (1)$$

where $F_{pi}$ is the local output factor of the i-th inverter, $P_{ei}$ is the output active power of the i-th inverter, and $P_n$ is the rated active power.

It can be seen from the formula (1) that the output factor contains information about both the rated power and the actual output power. If the output factors of the inverters are the same, it means that the active outputs of the inverters have been equally proportioned according to the rated capacity.

It is noted that the addition of the division in the formula (1) makes the magnitude of the output factor close to a per unit quantity with a value generally between 0 and 2. The transmission of the output factor on the communication path has low requirement on the data transmission bit width of the communication system; on the other hand, the communication bus only needs to transmit the only signal of the output factor, so the requirement on the communication traffic is reduced, realizing low bandwidth communication.

Step S101 is actually a process of determining a maximum output factor. Since each inverter corresponds to a local output factor, which local output factor is the maximum output factor is determined by using a differential delay algorithm, and the specific process may be referred to the following process.

For each inverter, the following process is performed:

S1011: measuring an output active power of the inverter, and determining a local output factor of the inverter according to the output active power and the rated active power.

In practical applications, the sampling instant can be set, and the output active power of the inverter is measured at each sampling instant. It can be understood that the process of determining the local output factor in this step can refer to the formula (1).

S1012, determining a latency of the inverter according to the local output factor and a maximum output factor in a previous cycle;

When this step is performed for the first time, the maximum output factor of the previous cycle can be initialized, for example, by setting a value within a reasonable range.

In practical application, $D_F$ represents a difference between the local output factor and the maximum output factor. Considering that the maximum output power of the inverter is usually twice the rated power, the maximum value of DFmax can only be around 4; $t_D$ is the differential delay.

$$D_F = F_{pi} - F_{pmax} \quad (2)$$

$$t_D = f(D_F) \quad (3)$$

Figure 2:
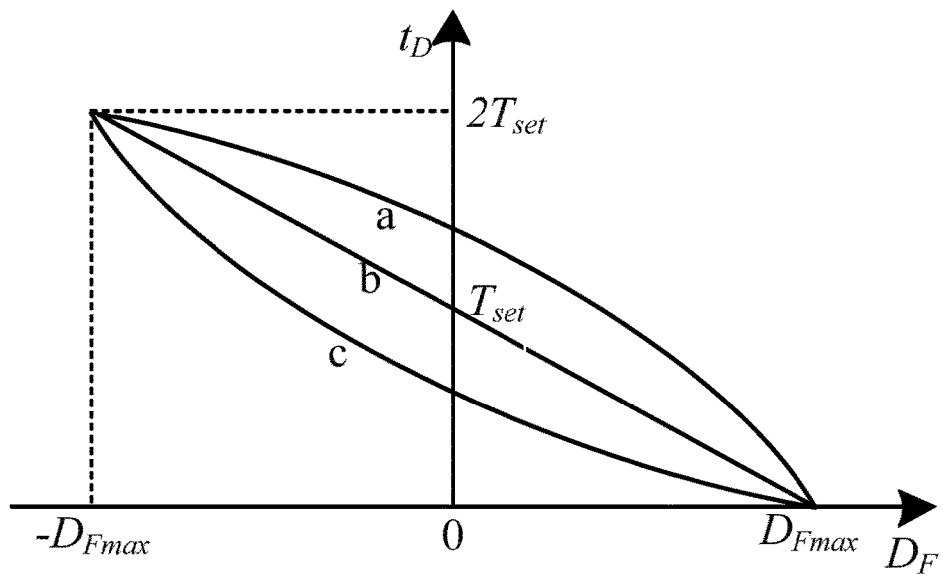
FIG. 2 is a schematic diagram showing three types of f functions in an embodiment of the present invention.

The f function in equation (3) can be represented with three types of curves, namely curves a, b, and c in FIG. 2, and $T_{set}$ is the set latency when the $D_F$ is zero.

When the f function is a convex function corresponding to the a curve, the larger the output of the inverter is, the larger $D_F$ is, and the smaller the delay $t_D$ is. Moreover, when $D_F$ is closer to $D_{Fmax}$, the slope of the curve is larger and the sensitivity is increased; but this type of function is less sensitive when the $D_F$ is smaller.

When the f function is a concave function corresponding to the c-curve, the larger the output of the inverter is, the larger $D_F$ is. However, the closer to $D_{Fmax}$ the $D_F$ is, the smaller the slope of the curve is and the lower the sensitivity is.

When the f function is a linear function corresponding to the b-curve, $D_F$ has a linear relationship with $t_D$. The slope of the curve is constant throughout the interval, the sensitivity is constant, and the implementation is relatively simple. Considering this, the curve b is selected as the function curve of f herein:

$$t_D = -kD_F + T_{set} \quad (4)$$

According to the formulas (2)~(4), the formula (5) can be obtained, and the latency of the i-th inverter can be calculated by the formula (5):

$$t_D = k(F_{pmax} - F_{pi}) + T_{set} \quad (5)$$

where $t_D$ is the latency of the i-th inverter, $F_{pi}$ is the local output factor of the i-th inverter, $F_{pmax}$ is the maximum output factor of the previous cycle, and k and $T_{set}$ respectively are preset slope and intercept.

S1013: Start waiting, and detecting whether the output factor sent on the communication path is received.

(1) If the output factor sent on the communication path is not received within the latency, the local output factor of the inverter is used as the maximum output factor of this cycle, and the maximum output factor of this cycle is sent to other inverters through the communication path.

For example, the i-th inverter does not receive the output factor transmitted on the communication path within its corresponding latency, indicating that the latency of the i-th inverter is the shortest among the inverters and the local output factor of the i-th inverter is the largest, so the local output factor of the i-th inverter can be used as the maximum output factor of this cycle to be sent to other inverters through the communication path. That is to say, the i-th inverter obtains the communication right during this cycle, and transmits its local output factor to other inverters in a one-to-many manner. Then, its delay timer is reset, and a new latency is calculated according to the formula (5) to prepare for the snatch of the communication right in the next cycle.

(2) If the output factor sent by the communication path is received within the latency, the received output factor is taken as the maximum output factor of this cycle.

For example, the i-th inverter receives the output factor sent by the communication path during its latency, indicating that the latency corresponding to the i-th inverter is not the shortest, and only the inverter having the shortest latency has the largest output factor which will be sent to the communication path, so the received output factor is the maximum output factor of this cycle. The i-th inverter does not participate in the competition for the communication right, the delay timer of the i-th inverter is reset, and a new latency $T_{set}$ is calculated according to the formula (5), and then the i-th inverter waits, preparing for the competition for communication right in the next cycle. Of course, it can be understood that the reset of the delay timer, the calculation of the latency, and the waiting are actions performed in the next cycle.

The advantage of the differential delay algorithm is that there is no need to give priority order or serial number in advance and no need to specify a specific inverter as a reference unit. When some units in the system fail, even the unit with the maximum output factor fails, a new unit with an output factor nearest to the maximum output factor is selected as the reference unit of the system based on the latency, thus ensuring the reliability of the system.

S102. determining, for each inverter in the micro-grid, an active power adjustment amount of the inverter according to the maximum output factor, a preset rated frequency, a local output factor and an actual angular frequency of the inverter.

There are many ways to calculate the active power adjustment amount in this step. An optional method is described below:

S1021, determining, for each inverter in the micro-grid, a reference angular frequency of the inverter according to the maximum output factor, the preset rated frequency, and the local output factor of the inverter;

For example, the reference angular frequency of the i-th inverter can be calculated by:

$$\theta_{refi} = 2\pi f^*_{MG} + k_{pf}(F_{pmax} - F_{pi}) \quad (6)$$

where $F_{pmax}$ is the maximum output factor of this cycle, $F_{pi}$ is the local output factor of the i-th inverter, $k_{pf}$ is a preset proportional coefficient, $f^*_{MG}$ is the rated frequency, and $\theta_{refi}$ is the reference angular frequency of the i-th inverter.

S1022: determining the active power adjustment amount of the inverter according to the reference angular frequency and the actual angular frequency of the inverter.

For example, the active power adjustment amount of the i-th inverter can be calculated by the following formula:

$$\Delta P_i = k_{pp}(\theta_{refi} - \theta_i) + k_{ip}\int(\theta_{refi} - \theta_i)dt \quad (7)$$

where $\Delta P_i$ is the active power adjustment amount of the i-th inverter, $\theta_{refi}$ is the reference angular frequency of the i-th inverter, $\theta_i$ is the actual angular frequency of the i-th inverter, and $k_{pp}$ and $k_{ip}$ are the preset proportional coefficient and integral coefficient respectively.

S103. performing frequency adjustment on the inverter according to the active power adjustment amount.

The above steps S101~S103 are only steps required for one cycle. To achieve the rated frequency of each inverter, it is necessary to perform multiple cycles to perform frequency adjustments on respective inverters for multiple times.

Figure 3:
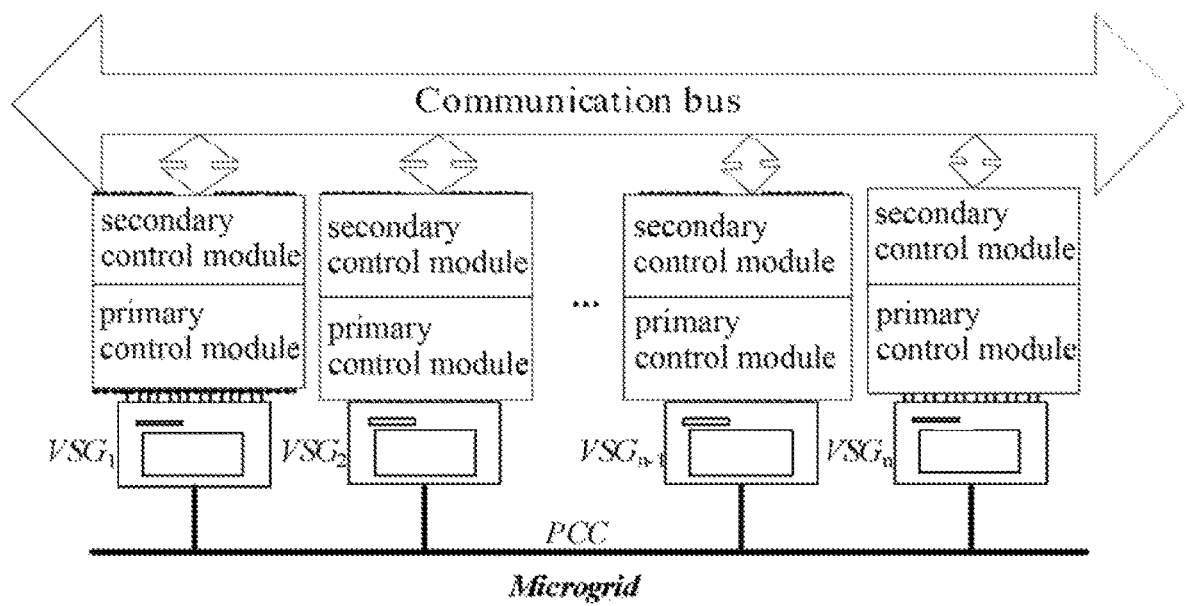
FIG. 3 is a logic block diagram of a distributed primary control module, a distributed secondary control module, and a micro-grid according to an embodiment of the present invention.
Figure 4:
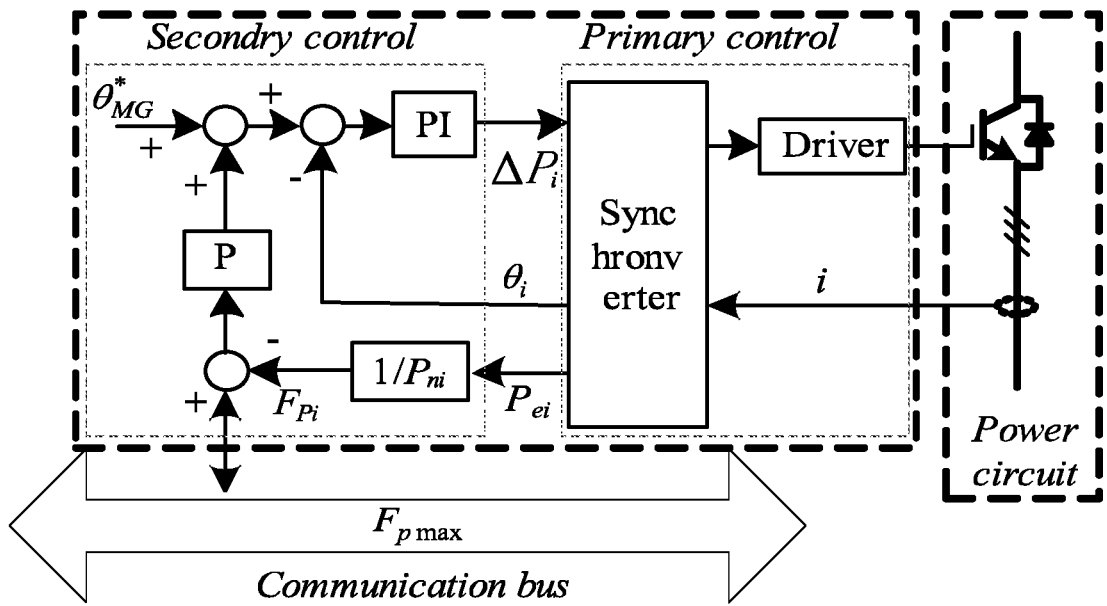
FIG. 4 is a logic block diagram of a primary control module, a secondary control module, and an inverter in an embodiment of the present invention.
Figure 5:
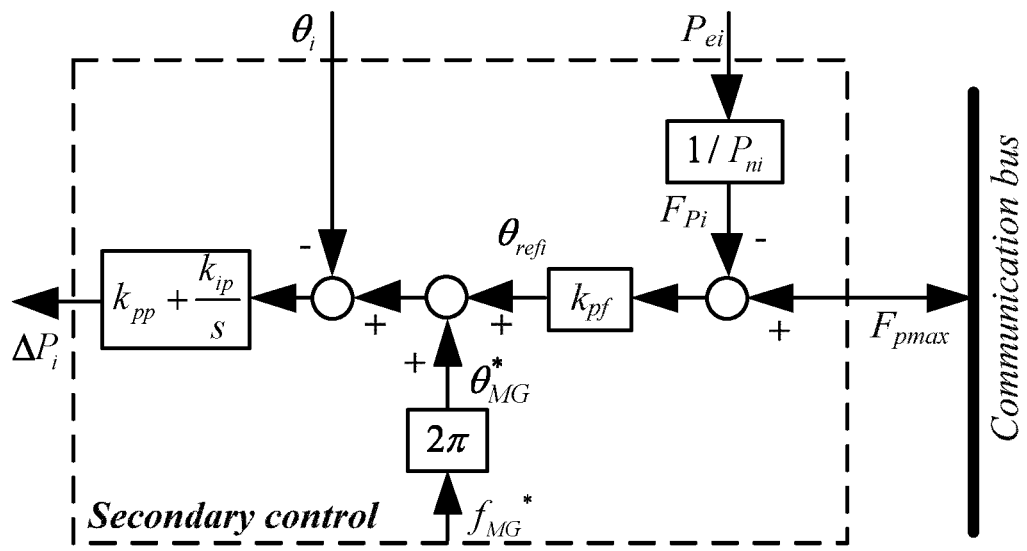
FIG. 5 is a logic block diagram of a secondary control module in an embodiment of the present invention.

In the following, the frequency adjustment method provided in the present invention is illustrated by taking the schematic circuit drawings shown in FIGS. 3 to 5 as an example.

In the micro-grid, multiple virtual synchronous inverters (VSGs) are included, and each VSG is connected with a primary control module and a secondary control module, the secondary control modules being connected through a CAN bus; in this example the CAN communication bus is used as the physical basis; that's to say that the communication interface of each VSG in the micro-grid adopts the CAN bus protocol uniformly, and the communication interface of each VSG is connected with the CAN bus. The primary control module and the secondary control module may be implemented as various hardware, for example as controllers. The communication interface is mainly responsible for information exchange between the inverters. The secondary control module is mainly responsible for receiving the maximum output factor transmitted on the CAN bus, and determining the active power adjustment amount of the corresponding inverter according to the maximum output factor to achieve a secondary frequency adjustment for local micro source and equalized proportions of the system power, while the primary control module is mainly responsible for primary adjustment of the micro-grid.

Figure 6:
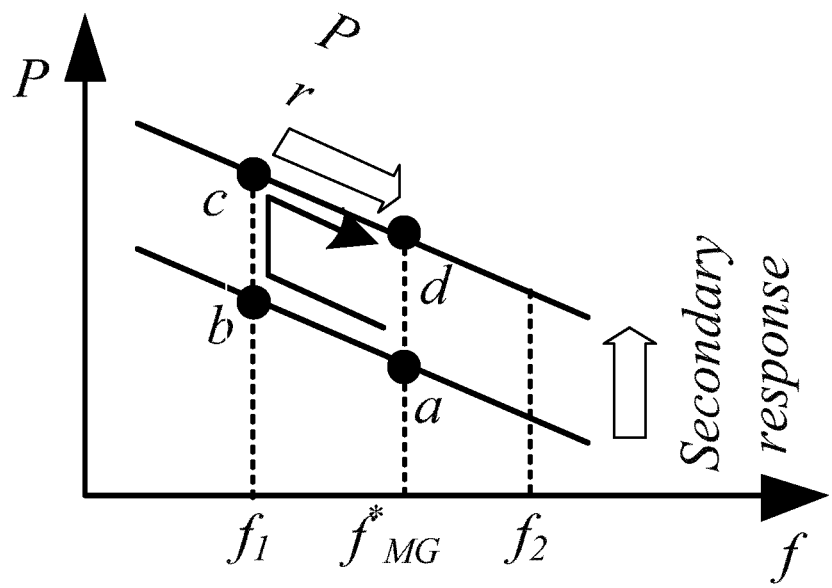
FIG. 6 is a schematic diagram showing a process of frequency adjustment of a micro-grid in an embodiment of the present invention.
Figure 7:
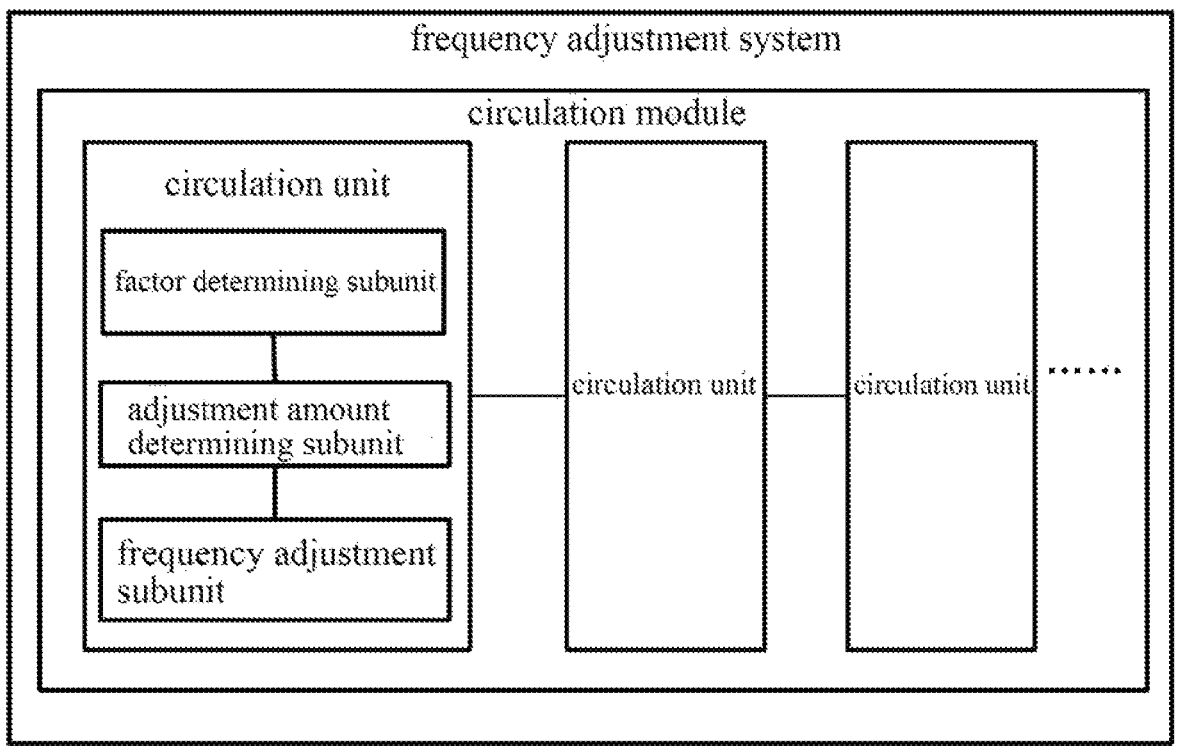
FIG. 7 is a structural block diagram of a frequency adjustment system of an islanded virtual synchronous micro-grid in an embodiment of the present invention.

As shown in FIG. 6, it is assumed that the system operates at a rated point a in the initial state. When the load power increases, the power balance of the system is broken, the system frequency is gradually reduced, and the operating point of the system moves from point a to point b. At this time, the secondary control module measures the output active power of the local inverter at each sampling instant, calculates the local output factor by using equation (1), then determines the maximum output factor, and compares the local output factor with the maximum output factor. Then, after the proportional operation in equation (6), the reference angular frequency is obtained, then the reference angular frequency is compared with the actual angular frequency, and then the PI operation is performed with the proportional coefficient and the integral coefficient in the equation (7) to obtain the active power adjustment amount. Subsequently, the adjustment amount is transferred to the primary control module, so that the system operating point moves from point b to point c; finally, under the frequency adjustment of the primary control module, the system operating point moves from point c to point d to achieve frequency restoration, bringing the system back to a stable state. It can be seen that the primary frequency adjustment isa lateral movement of the curve, and the secondary frequency adjustment is a vertical movement of the curve.

Obviously, when the system reaches the stable state, $D_F$ of each inverter is near 0, and the period of system communication is stable near $T_{set}$.

After the system is stable, there are two situations:

When there is no failure in the system communication, the maximum output factor is the same as the local output factor of the inverter. At this time, the output of an outer loop where the proportional coefficient $k_{pf}$ is located is zero, and its control degenerates to the tracking of the local frequency to a given frequency $f^*_{MG}$; because an inner loop where $k_{pp}$ and $k_{ip}$ locate contains an integral part, finally the local frequency can be maintained as the same as the rated frequency of the system, that is, the no-difference frequency tracking can be achieved.

When there is a fault in the system communication, $F_{pmax}$ can be set as its own local output factor, so that the output of the outer loop where the proportional coefficient $k_{pf}$ is located is zero, and the secondary control module directly degenerates to no-difference tracking of the local frequency with respect to the given frequency $f^*_{MG}$. The fast secondary frequency adjustment of frequency may still be achieved to ensure that the system frequency is always stable within the required range.

It can be seen that the main idea of the whole process is to use the differential delay algorithm to automatically select a VSG with the most active output in the system as the reference unit of the system, and then send the local output factor of the reference unit as the maximum output factor to the communication path. The secondary control module corresponding to each inverter receives the maximum output factor; gives the maximum output factor as a given reference for the outer loop proportional part; after passing a proportional integral inner loop, sends a generated active power adjustment amount to the primary control module. The primary control module ultimately achieves no-difference tracking of the rated frequency.

The frequency adjustment method provided by the invention independently selects the maximum output factor by using the differential delay algorithm Compared with the diffusive information comparison over the whole system or adjacent units in the prior art, the system has a faster response speed and rapid frequency adjustment of the micro-grid is achieved. As a strategy of inverter control, because the local output factors of the respective inverters are the same, the frequency adjustment of the virtual synchronous micro-grid is realized, and the power proportion equalization of the inverters is ensured. Moreover, the communication path in the invention, only carrying one kind of data of the maximum output factor, has relatively small communication pressure, so the system is less affected by the communication delay and the communication failure, and the stability of the frequency adjustment is relatively high, which is very suitable for the occasions with high demand on frequency.

The invention further provides a frequency adjustment system for an islanded virtual synchronous micro-grid, the system including:

a circulation module for performing frequency adjustment on inverters in the micro-grid in a cyclic manner until the respective inverters reach rated frequencies to achieve frequency adjustment and power proportion equalization of the inverters; where the circulation module includes multiple circulation units, each of which includes:

a factor determining subunit, configured to determine, in a differential delay manner, an inverter with a highest active output in the micro-grid as a reference unit, and send a local output factor of the reference unit as a maximum output factor of a current cycle to other inverters in the micro-grid through a communication path;

an adjustment amount determining subunit, configured to determine, for each inverter in the micro-grid, an active power adjustment amount of the inverter according to the maximum output factor, a preset rated frequency, a local output factor and an actual angular frequency of the inverter; and a frequency adjustment subunit, configured to perform frequency adjustment on the inverter according to the active power adjustment amount.

In some embodiments, the factor determining subunit is configured to: for each inverter, perform the following process: measuring an output active power of the inverter, and determining a local output factor of the inverter according to the output active power and the rated active power; determining a latency of the inverter according to the local output factor and a maximum output factor in a previous cycle; start waiting, and detecting whether the output factor sent on the communication path is received, where: (1) If the output factor sent on the communication path is not received within the latency, the local output factor of the inverter is used as the maximum output factor of this cycle, and the maximum output factor of this cycle is sent to other inverters through the communication path; and (2) If the output factor sent by the communication path is received within the latency, the received output factor is taken as the maximum output factor of this cycle.

In some embodiments, the factor determining subunit is configured to calculate the local output factor of the i-th inverter with the following equation:

$$F_{pi} = \frac{P_{ei}}{P_n}$$

where $F_{pi}$ is the local output factor of the i-th inverter, $P_{ei}$ is the output active power of the i-th inverter, and $P_n$ is the rated active power.

In some embodiments, the factor determining subunit is configured to calculate the latency of the i-th inverter using the following equation:

$$t_D = k(F_{pmax} - F_{pi}) + T_{set}$$

where $t_D$ is the latency of the i-th inverter, $F_{pi}$ is the local output factor of the i-th inverter, $F_{pmax}$ is the maximum output factor of the previous cycle, and k and $T_{set}$ respectively are preset slope and intercept.

In some embodiments, the adjustment amount determining subunit is configured to determine, for each inverter in the micro-grid, a reference angular frequency of the inverter according to the maximum output factor, the preset rated frequency, and the local output factor of the inverter; and determine the active power adjustment amount of the inverter according to the reference angular frequency and the actual angular frequency of the inverter.

In some embodiments, the adjustment amount determining subunit is configured to calculate the reference angular frequency of the i-th inverter using the following formula:

$$\theta_{refi} = 2\pi f^*_{MG} + k_{pf}(F_{pmax} - F_{pi})$$

where $F_{pmax}$ is the maximum output factor of this cycle, $F_{pi}$ is the local output factor of the i-th inverter, $k_{pf}$ is a preset proportional coefficient, $f^*_{MG}$ is the rated frequency, and $\theta_{refi}$ is the reference angular frequency of the i-th inverter.

In some embodiments, the adjustment amount determining subunit is configured to calculate the active power adjustment amount of the i-th inverter using the following formula:

$$\Delta P_i = k_{pp}(\theta_{refi} - \theta_i) + k_{ip}\smallint(\theta_{refi} - \theta_i)dt$$

where $\Delta P_i$ is the active power adjustment amount of the i-th inverter, $\theta_{refi}$ is the reference angular frequency of the i-th inverter, $\theta_i$ is the actual angular frequency of the i-th inverter, and $k_{pp}$ and $k_{ip}$ are the preset proportional coefficient and integral coefficient respectively.

It is to be understood that the frequency adjustment system provided by the present invention corresponds to the frequency adjustment method provided by the present invention. For the explanation, examples, and beneficial effects of the related content, reference may be made to the corresponding part in the frequency adjustment method, and details are not described herein.

The present invention further provides a computer storage medium having stored thereon a computer program that can implement the foregoing method when being executed by a processor.

It should be noted that the relationship terminologies such as "first", "second" and the like are only used herein to distinguish one entity or operation from another, rather than to necessitate or imply that the actual relationship or order exists between the entities or operations. Furthermore, terms of "include", "comprise" or any other variants are intended to be non-exclusive. Therefore, a process, method, article or device including a plurality of elements includes not only the elements but also other elements that are not enumerated, or also include the elements inherent for the process, method, article or device. Unless expressively limited otherwise, the statement "comprising (including) one . . . " does not exclude the case that other similar elements may exist in the process, method, article or device.

The above embodiments are only used to illustrate the technical solutions of the present invention, and are not intended to be limiting; although the present invention has been described in detail with reference to the foregoing embodiments, it will be understood by those of ordinary skill in the art that the technical solutions described in the foregoing embodiments can be modified, or equivalent replacements can be made to some of the technical features, and the modifications and replacements would not render the essential of the solutions deviate from the scope of the disclosure.

We claim:

1. A frequency adjustment method for an islanded virtual synchronous micro-grid, comprising:
    performing frequency adjustment on inverters in the micro-grid in a cyclic manner until the respective inverters reach rated frequencies, to achieve frequency adjustment and power proportion equalization of the inverters; wherein each cycle comprises:
    S101, determining, in a differential delay manner, an inverter with a highest active output in the micro-grid as a reference unit, and sending a local output factor of the reference unit as a maximum output factor of a current cycle to other inverters in the micro-grid through a communication path;
    wherein the local output factor of the i-th inverter is calculated by:

$$F_{pi} = \frac{P_{ei}}{P_n}$$

wherein $F_{pi}$ is the local output factor of the i-th inverter is, $P_{ei}$ is a output active power of the i-th inverter, and $P_n$ is a rated active power.
    S102, determining, for each inverter in the micro-grid, an active power adjustment amount of the inverter according to the maximum output factor, a preset rated frequency, a local output factor and an actual angular frequency of the inverter; and
    S103, performing frequency adjustment on the inverter according to the active power adjustment amount.

2. The method according to claim 1, wherein step S101 comprises:
    for each inverter, performing following process:
    measuring an output active power of the inverter, and determining a local output factor of the inverter according to the output active power and the rated active power;
    determining a latency of the inverter according to the local output factor and a maximum output factor in a previous cycle; and
    start waiting, and detecting whether the output factor sent on the communication path is received, wherein:
        if the output factor sent on the communication path is not received within the latency, the local output factor of the inverter is used as the maximum output factor of this cycle, and the maximum output factor of this cycle is sent to other inverters through the communication path; and
        if the output factor sent by the communication path is received within the latency, the received output factor is taken as the maximum output factor of this cycle.

3. The method according to claim 2, wherein the latency of the i-th inverter is calculated by:

$$t_D = k(F_{pmax} - F_{pi}) + T_{set}$$

wherein $t_D$ is the latency of the i-th inventer, $F_{pi}$ is the local output factor of the i-th inverter, $F_{pmax}$ is the maximum output factor of the previous cycle, and k and $T_{set}$ respectively are preset slope and intercept.

4. The method according to claim 1, wherein step S102 comprises:
    determining, for each inverter in the micro-grid, a reference angular frequency of the inverter according to the maximum output factor, the preset rated frequency, and the local output factor of the inverter; and
    determining the active power adjustment amount of the inverter according to the reference angular frequency and the actual angular frequency of the inverter.

5. The method according to claim 4, wherein the reference angular frequency of the i-th inverter is calculated by:

$$\Delta P_i = k_{pp}(\theta_{refi} - \theta_i) + k_{ip}\smallint(\theta_{refi} - \theta_i)dt$$

wherein $F_{pmax}$ maximum output factor of this cycle, $F_{pt}$ is the local output factor of the i-th inverter, $k_{pf}$ is a preset proportional coefficient, $f^*_{MG}$ is the rated frequency, and $\theta_{refi}$ is the reference angular frequency of the i-th inverter.

6. The method according to claim 4, wherein the active power adjustment amount of the i-th inverter is calculated by:

$$\Delta P_i = k_{pp}(\theta_{refi} - \theta_i) + k_{ip}\smallint(\theta_{refi} - \theta_i)dt$$

wherein $\Delta P_i$ is the active power adjustment amount of the i-th inverter, $\theta_{ref_i}$ is the reference angular frequency of the i-th inverter, $\theta_t$ is the actual angular frequency of the i-th inverter, and $k_{pp}$ and $k_{ip}$ are the preset proportional coefficient and integral coefficient respectively.

7. A non-transitory computer storage medium having stored thereon a computer program, wherein the method according to claim 1 is implemented when the computer program is executed by a processor.

\* \* \* \* \*